(12) United States Patent  
Hadley

(10) Patent No.: US 6,676,141 B1
(45) Date of Patent: Jan. 13, 2004

(54) ALTERNATIVE BIN CART

(76) Inventor: Ray Hadley, 5520 N. US 1, Melbourne, FL (US) 32940

( * ) Notice: Subject to any disclaimer, the term of this patent is extended or adjusted under 35 U.S.C. 154(b) by 0 days.

(21) Appl. No.: 09/795,307

(22) Filed: Mar. 1, 2001

(51) Int. Cl.[7] ................................................. B62B 11/00
(52) U.S. Cl. ............................ 280/47.35; 280/47.19; 280/47.26; 220/909
(58) Field of Search .................... 280/47.35, 47.17, 280/47.26, 47.19, 47.34, 79.1; 220/909, 404; 411/343

(56) References Cited

U.S. PATENT DOCUMENTS

| | | | | |
|---|---|---|---|---|
| 3,325,182 A | * | 6/1967 | Kelley | 280/47.19 |
| 3,379,451 A | * | 4/1968 | Marini et al. | 280/47.19 |
| 3,463,502 A | * | 8/1969 | Gough | 280/47.19 |
| 3,907,117 A | | 9/1975 | Williams | 211/71 |
| 4,313,612 A | | 2/1982 | Rubens | 280/79.1 |
| 4,357,029 A | * | 11/1982 | Marini et al. | 280/47.19 |
| 4,458,906 A | | 7/1984 | Lamson | 280/47.34 |
| 4,821,903 A | * | 4/1989 | Hayes | 280/47.34 |
| 4,984,704 A | * | 1/1991 | O'Malley | 280/47.19 |
| 5,015,143 A | * | 5/1991 | Carson | 220/909 |
| 5,044,644 A | * | 9/1991 | Duran et al. | 280/47.35 |
| D327,756 S | * | 7/1992 | Klein et al. | 280/47.26 |
| 5,135,245 A | | 8/1992 | Pagone et al. | 280/79.2 |
| 5,320,475 A | * | 6/1994 | Pinder | 414/343 |
| 5,375,860 A | * | 12/1994 | Ernsberger et al. | 280/47.35 |
| 5,398,838 A | * | 3/1995 | Dosunmu | 220/404 |
| 5,445,398 A | * | 8/1995 | Pierce | 280/47.26 |
| 5,462,299 A | * | 10/1995 | Maddux | 280/47.35 |
| 5,820,143 A | * | 10/1998 | Rigo | 280/47.19 |
| 6,224,072 B1 | * | 5/2001 | Weck et al. | 280/47.35 |

* cited by examiner

Primary Examiner—Brian L. Johnson
Assistant Examiner—Hau Phan
(74) Attorney, Agent, or Firm—Patent & Trademark Services; Thomas Zack; Joseph H. McGlynn

(57) ABSTRACT

A cart and container assembly with wheels and a handle that is specifically designed to transport and hold recycle bins for recyclable materials.

3 Claims, 2 Drawing Sheets

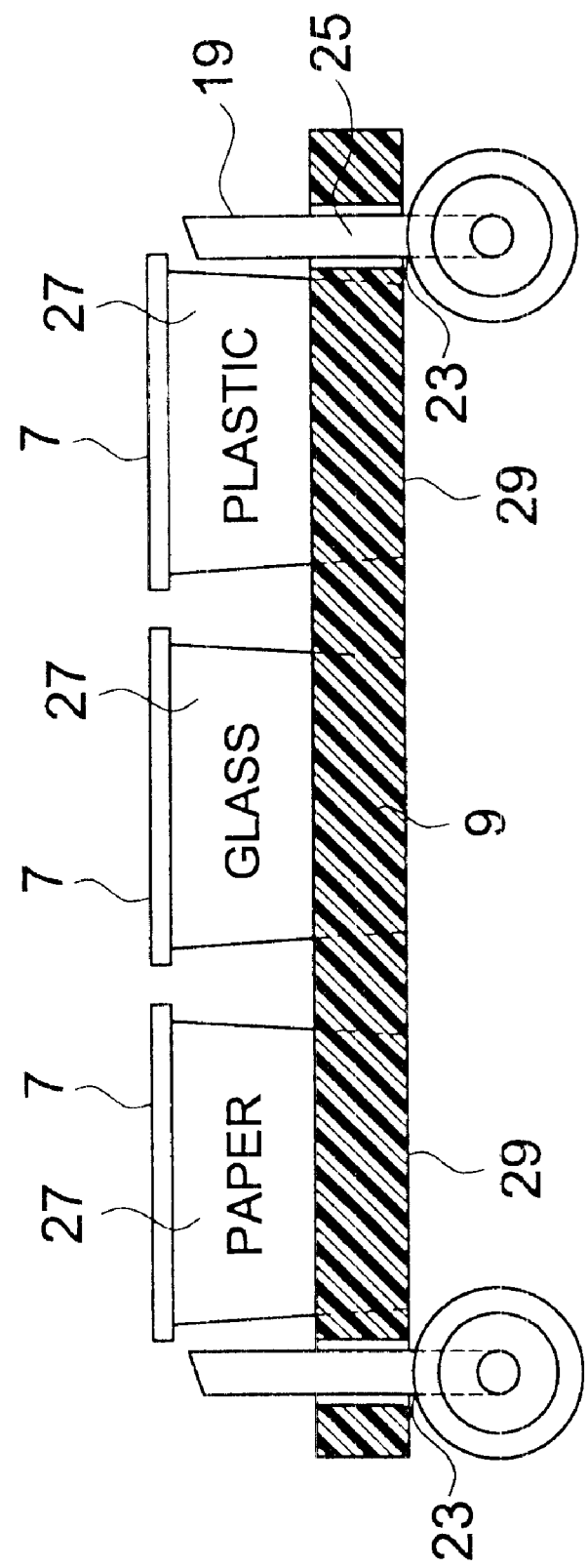

ALTERNATIVE BIN CART

BACKGROUND OF THE INVENTION

This invention relates to a cart with wheels and a handle for transporting recycling bins.

Carts that have wheels and a handle which are used to transport bins, containers or the like are known. For example, in one prior art invention a cart with wheels and a handle is used for transporting trash containers.

In another invention a trash container carrier with flanges is used to hold one or more containers and a removable strap is used to secure the containers. A related invention discloses a platform hand truck with a removable handle that can be attached at either end of the truck.

Still another cart and container assembly has wheels to transport trash containers at the same time.

DESCRIPTION OF THE PRIOR ART

Wheeled carts that are used to transport one or more containers or bins at the same time are known. When more than one container or bin needs to be moved it is very desirable to move the containers at the same time to save effort and time. This finds particular adapt ably when several bins each having different recyclable materials are to be moved to the curb for collection. An example of a cart with wheels and a handle used for transporting trash containers is disclosed in U.S. Pat. No. 3,907,117 to Williams.

U.S. Pat. No. 4,313,612 to Rubens discloses a trash container carrier with flanges that is used hold one or more containers with a removable strap used to secure the containers.

U.S. Pat. No. 4,468,906 to Lamson discloses a platform hand truck with a removable handle that can be attached at either end of the truck.

U.S. Pat. No. 5,135,245 to Pagone et al. discloses a cart and container assembly with wheels to transport several trash containers at the same time.

In the present invention a cart and container assembly with wheels and a handle is specifically designed to transport and hold recycle bins all as will be detailed in the specification that follows hereafter.

SUMMARY OF THE INVENTION

This invention relates to a cart and container/bin assembly with wheels and a handle is specifically designed to transport and hold recycle bins.

It is the primary object of the present invention to provide for an improved cart and bin assembly with wheels designed for recycle bins.

Another object is to provide for such an assembly in which the cart has a removable handle or handles mounted on either end with the cart having holding frame portions specifically designed for each bin.

These and other objects and advantages of the present invention will become apparent to readers from a consideration of the ensuing description and the accompanying drawings.

BRIEF DESCRIPTION OF THE DRAWINGS

FIG. 3 is a side view of the cart shown in FIG. 1 with three recycle bins inserted in the holding frame portions.

DESCRIPTION OF THE PREFERRED EMBODIMENT

Figure 1:
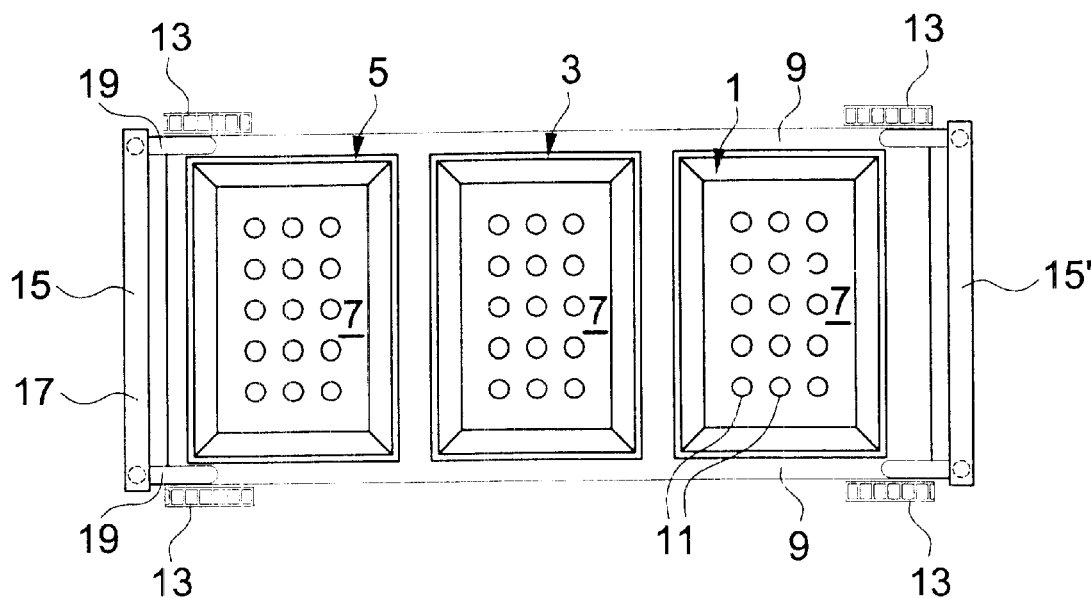
FIG. 1 is a top view of the cart used in the present invention showing the holding frame portions specifically designed for each bin.

FIG. 1 is a top view of the cart used in the present invention showing the three holding frame portions 1, 3, and 5 each of which is specifically designed for holding a recycling container or bin 7. A bin is shown inserted into each of the holding frames. Extending completely around the holding frame portions is an outer cart frame 9 into which the holding frame portions are molded. Each of the holding frames 1, 3, and 5 consists of a opening with four inwardly and downwardly slanted sides and a lower opened bottom. The three inserted bins 7 each have sides and overall dimensions specifically selected to engage in a complementary manner the sides of a holding frame into which the particular recycle bin is inserted. Each bin may have spaced holes 11 on its bottom surface for ventilation and drainage purposes. If desired, all of the holding frames could have the same dimensions and angle of tilt as the holding frames if each of the bins is the same or each holding frame could be specifically designed to hold a specific bin whose dimensions and angle of tilt is different from the other bins and the other holding frame members. Examples of materials that may be recyclable with a bin for each include paper products, glass products and plastics.

The cart's frame 9 is shown as generally rectangular with four semi-pneumatic roll able members such as the wheels 13 mounted near each corner of the rectangle to the cart. Each wheel is manufactured with a center opening that is slightly larger than the mounting axle or tube on which it is mounted to rotate. Typically, the tolerance of clearance between the wheel's opening and the diameter of the axle on which mounted is no greater than 1/64 of an inch. Near or at the end of the mounting axle a hole receives a cotter pin to secure the wheel to the axle.

Extending upwardly from the cart's frame 9 is at least one handle 15. Two handles 15 and 15' are shown to indicate the same handle is detachable from the front or rear of the cart and placeable on opposite alternate sides of the cart. The handle 15 has a cross-cart upper horizontally disposed member 17 and two attached perpendicular vertically disposed side members 19. The lower free ends of the side members 19 are insertable into two side locking mounts on the cart frame 9 from which they may be lifted to detach them and move the handle to the opposite side of the cart.

Figure 2:
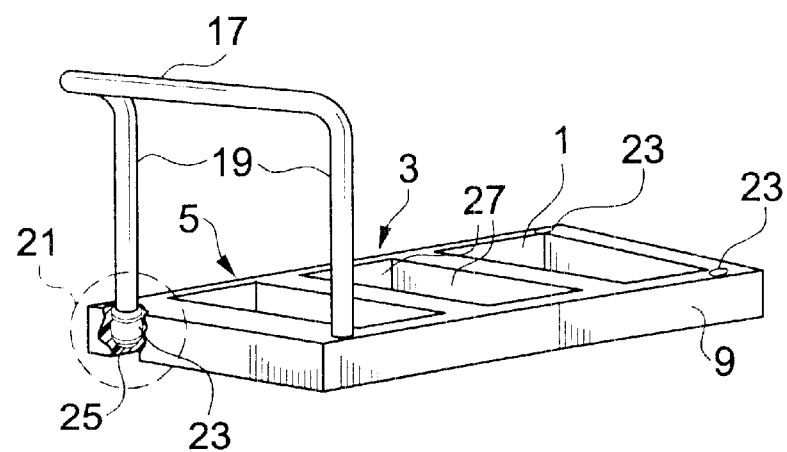
FIG. 2 is a perspective view of the cart of the present invention without its four wheels or bins.

FIG. 2 is a perspective view of the cart of the present invention without its four wheels or bins. The circled portion 21 is a cut away section which shows the internal mating side locking mount 23 built into the molded frame 9. Each of the two lower free ends 25 of the vertical handle members 19 has two spaced ringed and ridged surfaces which can be forced into the opening formed by mount 23 to lock the handle to the cart frame 9. Two such openings for mount 23 are located on opposite sides of the frame to receive the handle ends 25 and lock them in place. By pulling upwardly with some force the handle ends 25 can be dislodged from their mounting openings 23. Within the confines of frame 9 the molded openings constituting the holding frames 1, 3, and 5 for the bins. In the example shown, the opening are rectangular with four downwardly slopping sides 27 that engage the sides of the recycle bins. Plastic is shown as the material for the frame 9 and it may be reinforced with aluminum or stainless steel for added strength or other weather resistant materials.

FIG. 3 is a side view of the cart shown in FIG. 1 with three recycle bins 7 inserted in the holding frame portions 1, 3, and 5. Only the lower portions of handle members 19 are shown with the sides of frame 9 cut away to show the two side mounts 23. The two spaced ringed and ridged surfaces on the lower ends 25 of members 19 are not shown for simply purposes. The end labeled 19' denotes the alternate position of the handle lower ends and not another handle.

Indicia 27 indicating the particular recyclable material for a given bin 7 appears on the sides of the bin. The bottom surfaces 29 of each bin 7 are positioned to be at approximately the same level as the lower portion of frame 9. The sides for the three openings of the holding frame portions 1, 3, and 5 are substantially the same as the tilted and tapered sides of the three bins. This prevents the bins from falling through the frame portions while providing for their secure holding to the movable frame.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A cart and bin assembly comprising:

a cart having a frame with a plurality of holding frame portions each of which is adapted to hold a recycle bin;

each of said plurality of holding frame portions having an opening with sides that extend into the frame of the cart and are slanted inwardly and downwardly, a plurality of recycle bins for different recyclable materials, one of said bins being mounted in each of said plurality of holding frame portions, each of said recycle bins having sides that engage the sides of the holding frame portion in which mounted which the sides of the recycle bin being configured to complement the inwardly and downwardly slanted side of the holding frame portion, a plurality of rollable members mounted to the frame of said cart, and a handle mounted to said frame and extending upwardly from the frame of the cart, and wherein the handle has an upper horizontally disposed portion and two lower vertically disposed portions, the vertically disposed portions having lower ends that are mounted in holes within the frame.

2. The assembly as claimed in claim 1, wherein the lower ends of the handles that are mounted in the frame have spaced ring ridges.

3. The assembly as claimed in claim 2, wherein each of said recycle bins has indicia indicating a particular recyclable material different from the other bins.

\* \* \* \* \*